(12) United States Patent
Kim et al.

(10) Patent No.: US 11,541,321 B2
(45) Date of Patent: Jan. 3, 2023

(54) SELF-POWERED TOY

(71) Applicant: JEJU NATIONAL UNIVERSITY INDUSTRY-ACADEMIC COOPERATION FOUNDATION, Jeju-si (KR)

(72) Inventors: Sang jae Kim, Jeju-si (KR); Arunkumar Chandrasekhar, Jeju-si (KR)

(73) Assignee: JEJU NATIONAL UNIVERSITY INDUSTRY-ACADEMIC COOPERATION FOUNDATION, Jeju-Si (KR)

(*) Notice: Subject to any disclaimer, the term of this patent is extended or adjusted under 35 U.S.C. 154(b) by 260 days.

(21) Appl. No.: 16/956,488

(22) PCT Filed: Jun. 29, 2018

(86) PCT No.: PCT/KR2018/007405
§ 371 (c)(1),
(2) Date: Feb. 23, 2021

(87) PCT Pub. No.: WO2019/124658
PCT Pub. Date: Jun. 27, 2019

(65) Prior Publication Data
US 2021/0213367 A1 Jul. 15, 2021

(30) Foreign Application Priority Data
Dec. 20, 2017 (KR) .......................... 10-2017-0176565

(51) Int. Cl.
*A63H 29/22* (2006.01)
*H02N 1/04* (2006.01)

(52) U.S. Cl.
CPC ............... *A63H 29/22* (2013.01); *H02N 1/04* (2013.01)

(58) Field of Classification Search
CPC ........ A63H 29/22; A63H 33/00; A63H 33/26; H02N 1/04; H02N 2/18
(Continued)

(56) References Cited

U.S. PATENT DOCUMENTS 4,929,211 A * 5/1990 Resnick ................. A63B 23/16
446/14
8,519,596 B1 * 8/2013 Kim ........................ H02N 1/04
310/309
(Continued)

FOREIGN PATENT DOCUMENTS

CN 106178539 A * 12/2016
CN 108452535 A * 8/2018
(Continued)

OTHER PUBLICATIONS

International Search Report for International application No. PCT/KR2018/007405 dated Nov. 14, 2018 (Nov. 14, 2018).

*Primary Examiner* — Alexander R Niconovich

(57) ABSTRACT

The present invention relates to a self-powered toy comprising a power generation unit and a display unit electrically connected to the power generation unit, the power generation unit comprising a first electrode located on a first support layer; a first structure including a charge acquisition layer located on the first electrode; a second structure including a second electrode located on a second support layer; and a gap between the charge acquisition layer of the first structure and the second electrode of the second structure, which at least partially face each other. The gap is removed by an external force directly or indirectly applied to the first structure, the second structure, or both thereof and is formed again when the external force is removed, and the display unit is driven by power generated by the power generation unit according to the removal and formation of the gap.

8 Claims, 8 Drawing Sheets
(8 of 8 Drawing Sheet(s) Filed in Color)

(58) Field of Classification Search
USPC .......................... 446/484, 491, 486; 310/310
See application file for complete search history.

(56) References Cited

U.S. PATENT DOCUMENTS

| | | | |
|---|---|---|---|
| 9,484,842 B2* | 11/2016 | Wang | ........................ H02N 1/04 |
| 9,790,928 B2* | 10/2017 | Wang | ........................ H02J 7/345 |
| 9,887,644 B2* | 2/2018 | Kim | ........................ H02N 1/04 |
| 10,305,395 B2* | 5/2019 | Kim | ........................ H02N 1/04 |
| 10,312,829 B2* | 6/2019 | Liu | ........................ H02N 1/04 |
| 10,425,018 B2* | 9/2019 | Wang | ........................ H02N 1/04 |
| 2014/0246951 A1* | 9/2014 | Wang | ........................ H02N 1/04 |
| | | | 310/310 |
| 2014/0338458 A1* | 11/2014 | Wang | ........................ G01L 1/005 |
| | | | 310/309 |
| 2016/0036351 A1 | 2/2016 | Kim et al. | |
| 2021/0213367 A1* | 7/2021 | Kim | ........................ H02N 1/04 |
| 2022/0239236 A1* | 7/2022 | Swisher | ................... H02N 1/04 |

FOREIGN PATENT DOCUMENTS

| | | | | |
|---|---|---|---|---|
| KR | 10-2015-0054600 A | | 5/2015 | |
| KR | 20150054600 A | * | 5/2015 | ............. A63H 29/22 |
| KR | 20160036351 A | * | 4/2016 | |
| KR | 10-2016-0125276 A | | 10/2016 | |
| KR | 10-2017-0030674 A | | 3/2017 | |
| KR | 20170030509 A | * | 3/2017 | |
| KR | 10-2017-0122414 A | | 11/2017 | |
| KR | 101871602 B1 | * | 6/2018 | |
| WO | WO-2014101395 A1 | * | 7/2014 | ............. A63H 29/22 |

* cited by examiner

SELF-POWERED TOY

TECHNICAL FIELD

The present invention relates to a self-powered toy in which a display unit is driven by power generated by a power generation unit employing triboelectric nano generator (TENG) therein.

BACKGROUND ART

Smartphones, video games, virtual reality games have been making turning point in various fields. The American Academy of Pediatrics reported that 97% of children under age four have been affected by mobile apparatus. Children prefer interactive toys than traditional toys. The interactive toys are easily accessible. However, since these interactive toys are operated by additional power supply, there is a disadvantage in that battery of toys should be frequently replaced.

Various kinds of research have been performed in the field of energy recovery systems and energy storage systems in the world. Some research has been focused on energy with stability, reliability, and eco-friendliness. As a realistic alternative to satisfy these needs, apparatus for recovering bio-mechanical energy such as electromagnetic generators, piezoelectric nano generators, and triboelectric nano generators have been suggested. In a recent, triboelectric nano generators (hereinafter, referred to as "TENG") is attracting great attention because they are effective biomechanical recovery apparatus. Z. L. Wang described about an energy recovery of TENG in energy sources such as vibrations, wind, water, and so forth, which are different (S. Wang, S. Niu, J. Yang, L. Lin, Z. L. Wang and W. E. T. Al, 2014.; Z. L. Wang, J. Chen, L. Lin, J. Ha, B.-S. Lee, Y. Park, C. Choong, J.-B. Kim, Z. L. Wang, H.-Y. Kim, J.-J. Park and U. I. Chung, Energy Environ. Sci., 2015, 8, 2250-2282.; Z. L. Wang, Faraday Discuss., 2014, 176, 447-58.). Various new studies about TENG and its application are being done.

The above-mentioned are retained by inventors for the present invention or technical information obtained in the course of invention, and is not considered as technologies disclosed to public prior to application of the present invention.

However, until now, TENG is not actively commercialized. The reason for this is that there are many different causes such as energy transmission efficiency, energy storage, environmental factors, packaging equipment, and so on. Accordingly, inventors of the present invention continue to develop applied products by focusing on energy recovery using TENG being biomechanical energy rather than energy storage and complete the present invention.

SUMMARY OF THE INVENTION

It is therefore an object of the present invention to provide a self-powered toy in which a display unit is driven by power generated by a power generation unit employing triboelectric nano generator (TENG) therein.

Embodiments of the present invention provide a self-powered toy comprising a power generation unit comprising a first electrode located on a first support layer, a first structure including a charge acquisition layer located on the first electrode, a second structure including a second electrode located on a second support layer, and a gap between the charge acquisition layer of the first structure and the second electrode of the second structure, which at least partially face each other, and a display unit electrically connected to the power generation unit. In this case, the gap is removed by an external force directly or indirectly applied to the first structure, the second structure, or both thereof and is formed again when the external force is removed, and the display unit is driven by power generated by the power generation unit according to the removal and formation of the gap.

In some embodiments, the charge acquisition layer includes one selected from the group consisting of polyester, poly-dimethyl-siloxane, and a combination thereof.

In some embodiments, the display unit includes a display apparatus or a sound generating apparatus.

In some embodiments, a housing formed with looped surfaces to have an empty space therein is further included. In this case, a first support layer is formed with one of inner surface of the looped surface in one entity or located on the one of inner surface of the looped surface, and a second support layer is formed with the other of inner surface of the looped surface opposing the first support layer in one entity or located on the other of inner surface of the looped surface, and the housing has elastic portions partially or wholly.

In some embodiments, the first support layer is located on a first plate or formed with the first plate in one entity, and the second support layer is located on a second plate or formed with the second plate in one entity. In this case, the first and second plates are positioned in order that the charge acquisition layer and second electrode layer are faced each other with a predetermined gap, and the gap is removed or formed by an external force by connecting the charge acquisition layer and second electrode layer each other through a connecting structure for connecting the first and second plates at least a portion of the charge acquisition layer and second electrode layer.

In some embodiments, the connecting structure further includes an elastic member to again form the removed gap by the external force.

In some embodiments, the power generation unit has a load resistor ranged from 80 k$\Omega$ to 120 k$\Omega$.

In some embodiments, an energy storage unit including a rectifier and a capacitor are further included.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

As next generation toys, various toys interactive and enjoyable with users have been suggested. A part of these toys uses a power supply and a battery which is frequently replaced. In a recent, an innovative biomechanical energy recovery method such as triboelectric nanogenerator (hereinafter, referred to as "TENG") has been introduced and this method is evaluated as an eco-friendly approach for recovering energy. Inventors of the present invention, for commercializing a TENG apparatus, apply a biomechanical TENG apparatus to a traditional toy, thereby completing a toy without a battery. Also, they tried to change the traditional toy to a smart toy to be succeeded by employing a method for converting biomechanical energy in a manner such as durable, eco-friendly, and cost-effective. As an example, a clapping toy is converted into a smart clapping duck toy (SCT-TENG), and a duck toy is converted into a smart duck toy (SDT-TENG). All of the SCT-TENG and SDT-TENG are based on a contact/separation (CS) mode between an active layer and an upper electrode layer. In an experimental sample, output voltages of the SCT-TENG and SDT-TENG represent respectively 65 $V_{P-P}$ and 260 $V_{P-P}$. In the present invention, a simplified internal circuit is embedded in a toy. According to shaking or pushing a self-powered toy, LED of the toy is turned on/off.

The present invention may, however, be embodied in different forms and should not be construed as limited to the embodiments set forth herein.

Various modifications to the preferred embodiments will be readily apparent to those skilled in the art and the generic principles herein may be applied to other embodiments. Thus, the present invention is not limited to the embodiment shown but is to be accorded the widest scope consistent with the principles and features described herein.

In the specification, terms such as "a first", "a second", or "A", "B" should be understood as the same terms and used for distinction. Terms such as "include" or "have" should be understood as designating that features, number, steps, operations, elements, parts, or combinations thereof exist and not as precluding the existence of or the possibility of adding one or more other features, numbers, steps, operations, elements, parts, or combinations thereof in advance.

As used herein, the phrase "B is located on A" means "B is located on A" or "B is located on another layer on A" and should not be construed as limited to "B meets or touches on surfaces of A".

Throughout the description and claims of this specification, the singular encompasses the plural unless the context otherwise requires.

Hereinafter, the present invention will be described in detail with reference to the drawings. In describing the present invention, detailed descriptions related to publicly known functions or configurations will be omitted in order not to obscure the gist of the present invention.

Figure 1:
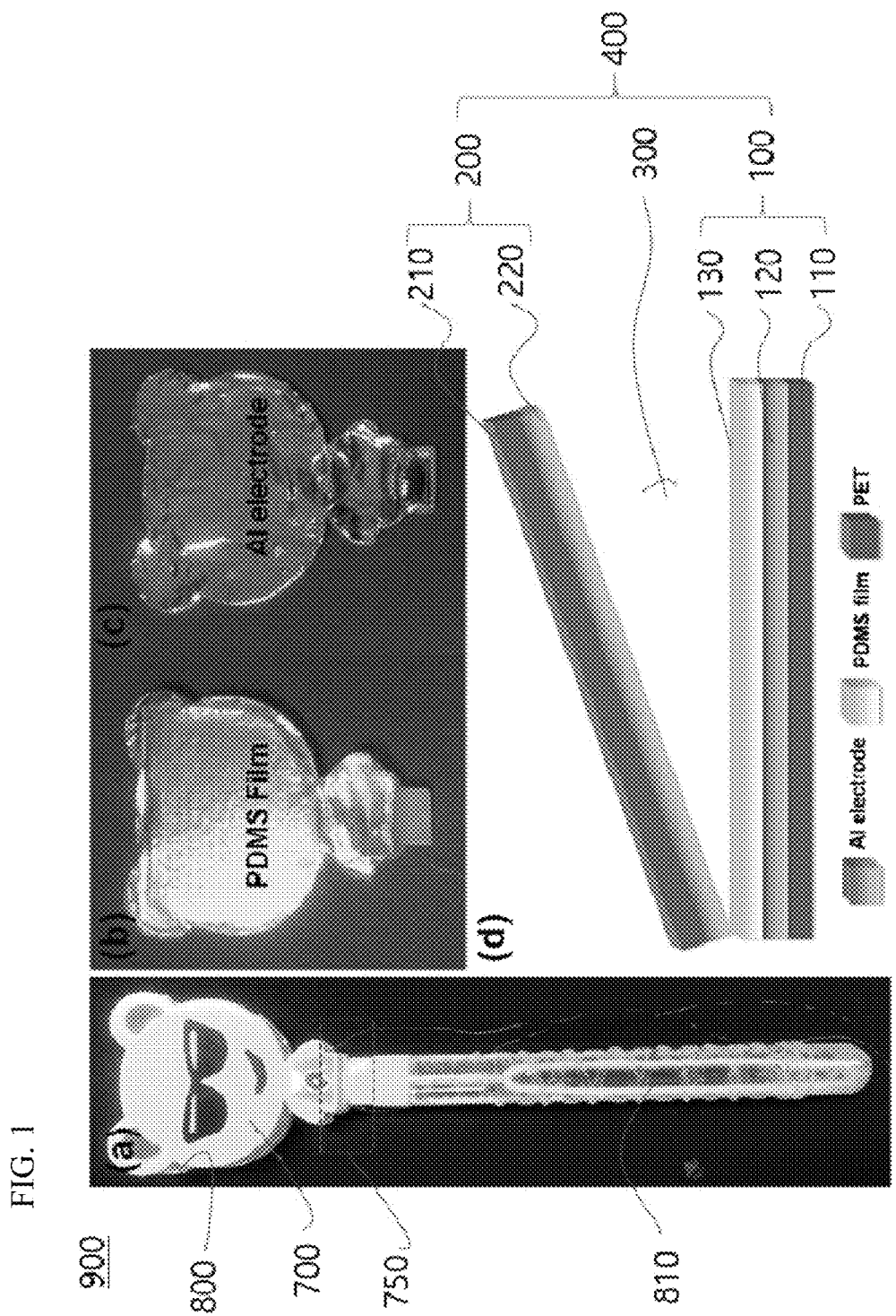
FIG. 1(a) is a photograph showing an appearance of a SCT-TENG according to an embodiment of the present invention.
FIG. 1(b) is a photograph showing a surface modified PDMS film and an aluminum bottom electrode according to an embodiment of the present invention.
FIG. 1(c) is a photograph showing an aluminum upper electrode according to an embodiment of the present invention.
FIG. 1(d) is schematic view of the SCT-TENG according to an embodiment of the present invention.

Referring to FIG. 1, a self-powered toy 900 according to an embodiment of the present invention comprising a power generation unit 400 comprises a first electrode 120 located on a first support layer 110, a first structure 100 including a charge acquisition layer 130 located on the first electrode 120, a second structure 200 including a second electrode 220 located on a second support layer 210, and a gap 300 between the charge acquisition layer 130 of the first structure and the second electrode 220 of the second structure 200, which at least partially face each other, and a display unit 500 electrically connected to the power generation unit.

The gap 300 is removed by an external force directly or indirectly applied to the first structure 100, the second structure 200, or both thereof and is formed again when the external force is removed, and the display unit 500 is driven by power generated by the power generation unit 400 according to the removal and formation of the gap 300.

The power generation unit 400 may be a triboelectric nanogenerator (TENG). In specifically, the present invention can provide a self-powered toy harmless to human beings by applying a simple structure and harmless materials.

The charge acquisition layer 130 includes one selected from the group consisting of polyester, poly-dimethyl-siloxane, and a combination thereof, and preferably is PDMS.

It is preferable that the charge acquisition layer 130 has high specific surface area through a surface treatment. For example, if a reaction solution is spin-coated on an etched surface of the charge acquisition layer 130 in the course of forming a PDMS layer, the surface of the PDMS layer may be formed of irregular protrusions to correspond to a shape of the etched surface of the charge acquisition layer 130, and thereby harvesting more power supply.

The charge donating layer (not shown) is further included on the second electrode 220 facing with the charge acquisition layer 130. The charge donating layer is positioned to be faced with the charge acquisition layer 130 having a gap therebetween.

The charge donating layer includes any one selected from the group consisting of papers, cottons, and a combination thereof. These materials are light and have an excellent durability as applied to toys.

Materials used as the above triboelectric nanogenerator are applicable as the first and second electrodes 120 and 220. Concretely, a copper electrode and an aluminum electrode are applicable to the first and second electrodes 120 and 220, respectively.

It is preferable that materials not preventing triboelectric are used as the first and second support layers 110 and 210. For instance, a PET (Polyethylene Terephthalate) film is applicable, but not limited thereto. Also, a housing 600 or first and second plates 700 and 800 perform a function as the first and second support layers 110 and 210.

The thickness of the first and second structures 100 and 200 is under 3 mm, or ranged from 0.01 mm to 1 mm. In examples described hereinafter, a triboelectric nanogenerator with very thin thickness can be embodied while providing currents to LCD display so that it is very suitable for self-powered toys.

The display unit 500 includes a display apparatus or a sound generating apparatus. Concretely, the display apparatus is LED or LDC, or a single bulb or panel. The sound generating apparatus makes a pre-input electric sound, words, or music.

The power generation unit 400 has a load resistor ranged from 80 kΩ to 120 kΩ.

Figure 5:
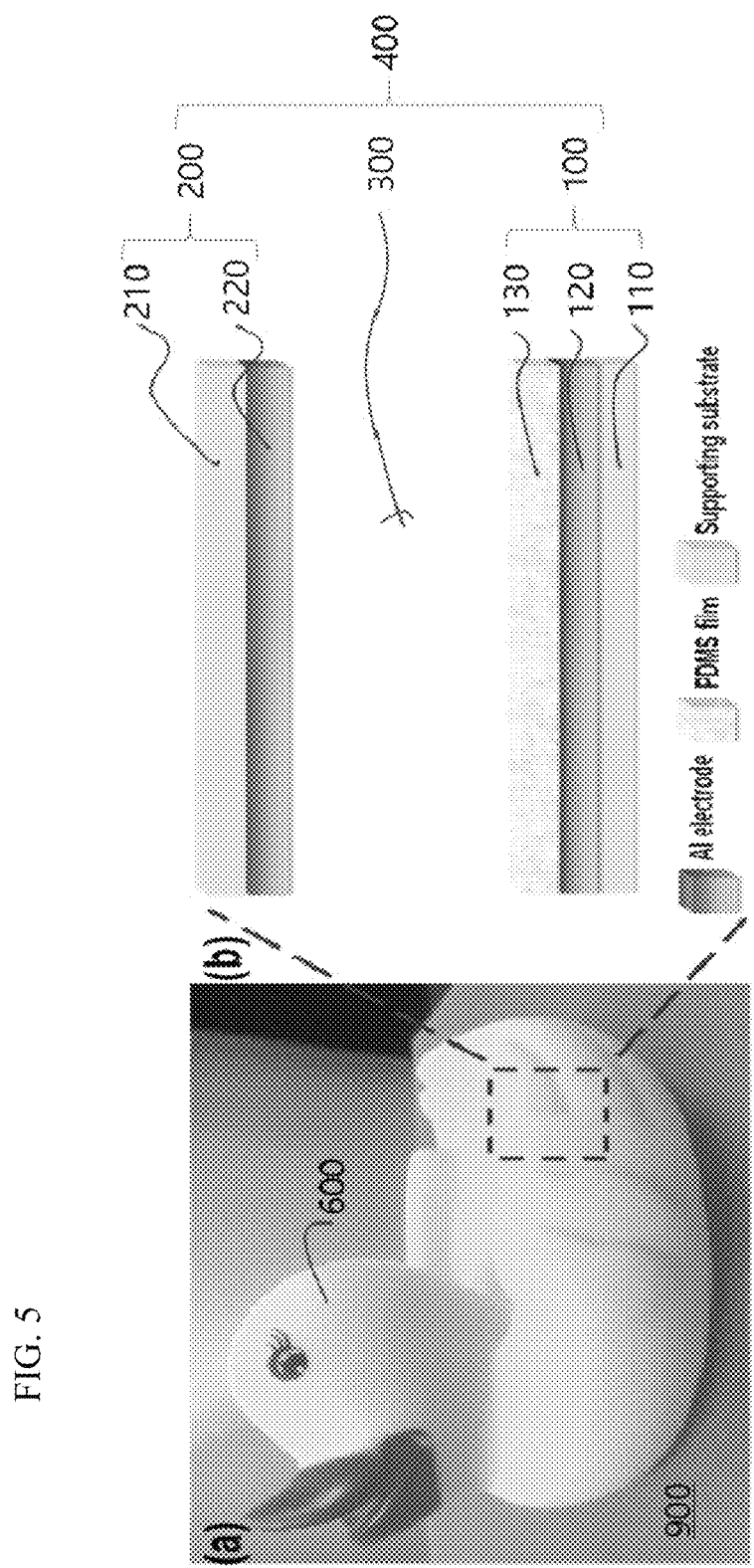
FIG. 5 shows a SDT-TENG according to an embodiment of the present invention, where (a) shows a photograph of an appearance of the SDT-TENG, and (b) illustrates a structure of the SDT-TENG.

Referring to FIG. 5, a self-powered toy 900 includes a housing 600 formed with looped surfaces to have an empty space therein. In this case, the first support layer 110 is formed with one of inner surface of the looped surface in one entity or located on the one of inner surface of the looped surface, and the second support layer 210 is formed with the other of inner surface of the looped surface opposing the first support layer 110 in one entity or located on the other of inner surface of the looped surface. The gap 300 is removed by an external force and is formed again when the external force is removed or by applying an external force toward opposite direction, which can be repeated. The removal and formation may be caused by the housing's inherent elasticity or a recovery of an elastic member included a connecting structure 750 for connecting the first and second structures 100 and 200.

Holes (not shown) may be formed on a part of the housing 600 having the looped surface for the purpose of air pressures of inside and outside of the housing 600. At this time, liquid-impermeable treatment may be performed with respect to the holes for preventing liquid or excessive vapor from inflow.

The above-mentioned elastic member is rubber, but not limited thereto.

Referring to FIG. 1, the first support layer 110 is located on a first plate 700 or formed with the first plate 700 in one entity, and the second support layer 210 is located on a second plate 800 or formed with the second plate 800 in one entity. The first and second plates 700 and 800 are positioned in order that the charge acquisition layer 130 and second electrode layer 220 are faced each other with a predetermined gap 300, and the gap 300 is removed or formed by an external force by connecting the charge acquisition layer 130 and second electrode layer 220 each other through a connecting structure 750 for connecting the first and second plates 700 and 800 at least a portion of the charge acquisition layer 130 and second electrode layer 220.

The connecting structure 750 further includes an elastic member to again form the removed gap 300 by the external force.

The above-mentioned elastic member is rubber or spring, but not limited thereto.

The power generation unit 400 and the display unit 500 are electrically connected. An energy storage unit (not shown) comprising a rectifier and a capacitor between the power generation unit 400 and the display unit 500 is further included.

The electrical connection between power generation unit 400 and the display unit 500 through a direct physical connection such as a copper wire, but not limited thereto.

Hereinafter, a method for driving the self-powered toy according to the present invention.

The gap of the first and second structures of the power generation unit, which is located in the housing having at least two plates or a space therein, becomes narrowed by an external force, and charges are created between the first and second electrodes. This created electrical energy is transmitted to the display unit, and the display unit converts the received electrical energy into light or sound to drive the self-powered toy. In generally, unlike a traditional toy using batteries, the self-powered toy according to the present invention can be interacted with users by driving the display unit through a repeated operation in which the gap is removed and formed again by an external force.

According to the present invention, an innovative approach method for recovering biomechanical energy applied to toys. The examples of the present invention are SCT-TENG and SDT-TENG. They employ eco-friendly materials and are operated in different operations such as a clapping and pressing but have in similar operation mechanism. TENG apparatus have a long operation stability and a function to quickly charge a common capacitor. The above-mentioned SCT-TENG and SDT-TENG are typical examples of a real-time self-powered toy. Through the present invention, traditional toys using batteries gradually become substituted as interactive smart toys and possibly promote commercialization in the field of TENG-based small equipment, in specifically, toys without batteries.

[Test Method]

Surface Treatment of Petri Dish

A petri dish manufactured with ABS polymers was cleaned by ethanol and desalted water and then again cleaned for one hour and a half at an oven of 50° C. Then, a surface etching treatment was performed with respect to the petri dish by soaking it in a beaker containing acetone being etchant for 120 seconds. Thereafter, the petri dish was cleaned by ethanol and desalted water and then dried at an air oven of 60° C. to manufacture a surface treated petri dish.

Manufacturing PDMS Film

PDMS monomer and cross-linking agent were mixed in weight ratio of 10:1, which were manufactured by Dow Corning Inc., through a magnetic stirring machine for 15 minutes, and moved to the surface treated petri dish to be spin-coated at 700 rpm for 20 seconds. After that, a heat treatment was performed with respect to the mixture to be cured at 70° C. for 40 minutes. Then, a copper electrode (12 mm×30 mm) and an aluminum electrode (12 mm×30 mm) were positioned at a minute interval. Finally, a PET sheet was adhered on bottoms of the petri dish to manufacture SP-TENG.

Manufacturing SCT-TENG

PDMS film pieces were cut in a shape of a clapping toy and then adhered together with an aluminum electrode. Other aluminum electrode was adhered to an opposite side of an active layer. Using thin copper electrodes, an electrical connection structure was formed.

Manufacturing SDT-TENG

The surface treated PDMS film (30 mm×50 mm) was cut out. A flat side of cut PDMS film was in contact with one side of the aluminum electrode, and the surface treated PDMS film was adhered to inner sides of the toy in which the PDMS film is adhered to bottom inner sides of the toy. The other side of the aluminum electrode was cut out to have the same area to be adhered to upper inner sides of the toy. Using thin copper electrodes, an electrical connection structure was formed.

Manufacturing Self-Powered SCT-TENG and Self-Powered SDT-TENG

The electrical output of SCT-TENG and SDT-TENG were DC signal and was converted through a bridge rectifier, and the output was connected through a LED circuit.

Measuring Electrical Property

In order to measure electrical properties, a linear monitor manufactured by LinMot Inc was applied. The output voltage and short currents were measured using an electrical voltmeter (Keithley 6514). Before measuring electrical properties, a drying treatment was performed at an air oven of 70° C. for 30 minutes to remove residual moisture of various equipment. To prevent external noises, all measures were performed in a faraday cage.

[Test Result]

It is essential to apply eco-friendly biomechanical materials to make smart toys for children. For this reason, SCT-TENG and SDT-TENG employed PDMS being biomechanical and aluminum electrodes. In addition, using SCT-TENG and SDT-TENG, it is possible to recover biomechanical energy capable of driving self-powered apparatus.

Figure 2:
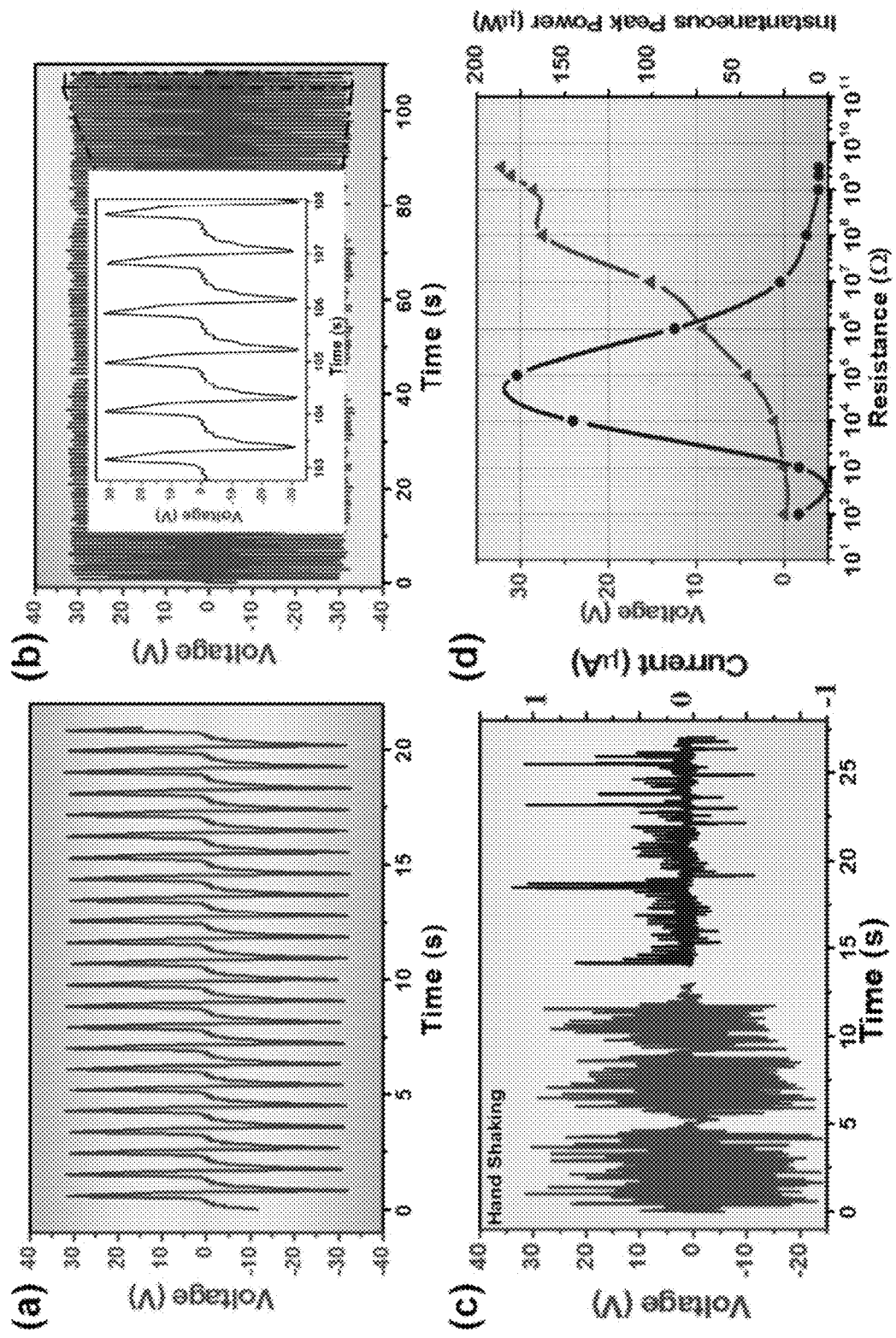
FIG. 2 is a graph with respect to an electro-reaction of a SCT-TENG according to an embodiment of the present invention, where (a) shows an output voltage while an external movement is applied, (b) shows a cyclic stability according to the external movement, and an inserted graph is an enlarged graph of a voltage signal at final section during a durability test, (c) shows a voltage obtained through a handshaking, and (d) shows a correlation between a voltage (see red color) and an instantaneous maximum power (see blue color) in aspect of an external load resistance.

FIG. 1(a) is a photograph showing an appearance of a SCT-TENG using a commercial clapping toy. FIG. 1(b) is a photograph showing a surface modified PDMS film and an aluminum bottom electrode according to an embodiment of the present invention. FIG. 1(c) is a photograph showing an aluminum upper electrode according to an embodiment of the present invention. In this case, the PDMS film and aluminum electrodes were designed to have a face shape of the toy for them to be installed on inner sides of the face of the toy. FIG. 1(d) is schematic view of the SCT-TENG according to an embodiment of the present invention. The PDMS film performs a function as an active layer, and the aluminum electrodes performs a function collect contact materials and electrodes at the same time. A PET sheet as a support layer was adhered to inner sides of the toy. In order to systematically study electric performance of the SCT-TENG, a computer controlling linear motor was used. Using these external movements, the contact and/or separation circumstances between an upper electrode and a lower electrode were created. FIG. 2(a) shows an electro-reaction of a SCT-TENG and that when the external movement was 1 m/s, the output voltage reached 30 V. For commercialization, durability test with respect to long-term operation of the SCT-TENG was required, and accordingly, cyclic stability test was performed for 100 seconds. FIG. 2(b) shows a voltage signal obtained while the cyclic stability test was performed and indicates that the performance of the SCT-TENG was constant and stable. To confirm the real-time recovery performance, a method for shaking apparatus was applied. FIG. 2(c) shows the output voltage and current according to real-time energy recovery, where the voltage was 30 V and current reached 1 µA. This showed that the SCT-TENG have high potential for recovering biomechanical energy. It is important to check optimal load resistance to integrate the SCT-TENG into an external circuit. Accordingly, a load resistance analysis was performed to check a load that matches with maximum power. FIG. 2(d) shows a voltage as compared with an external load resistance, where the maximum peak power of 175 µW was obtained when load resistance was 100 kΩ.

Figure 3:
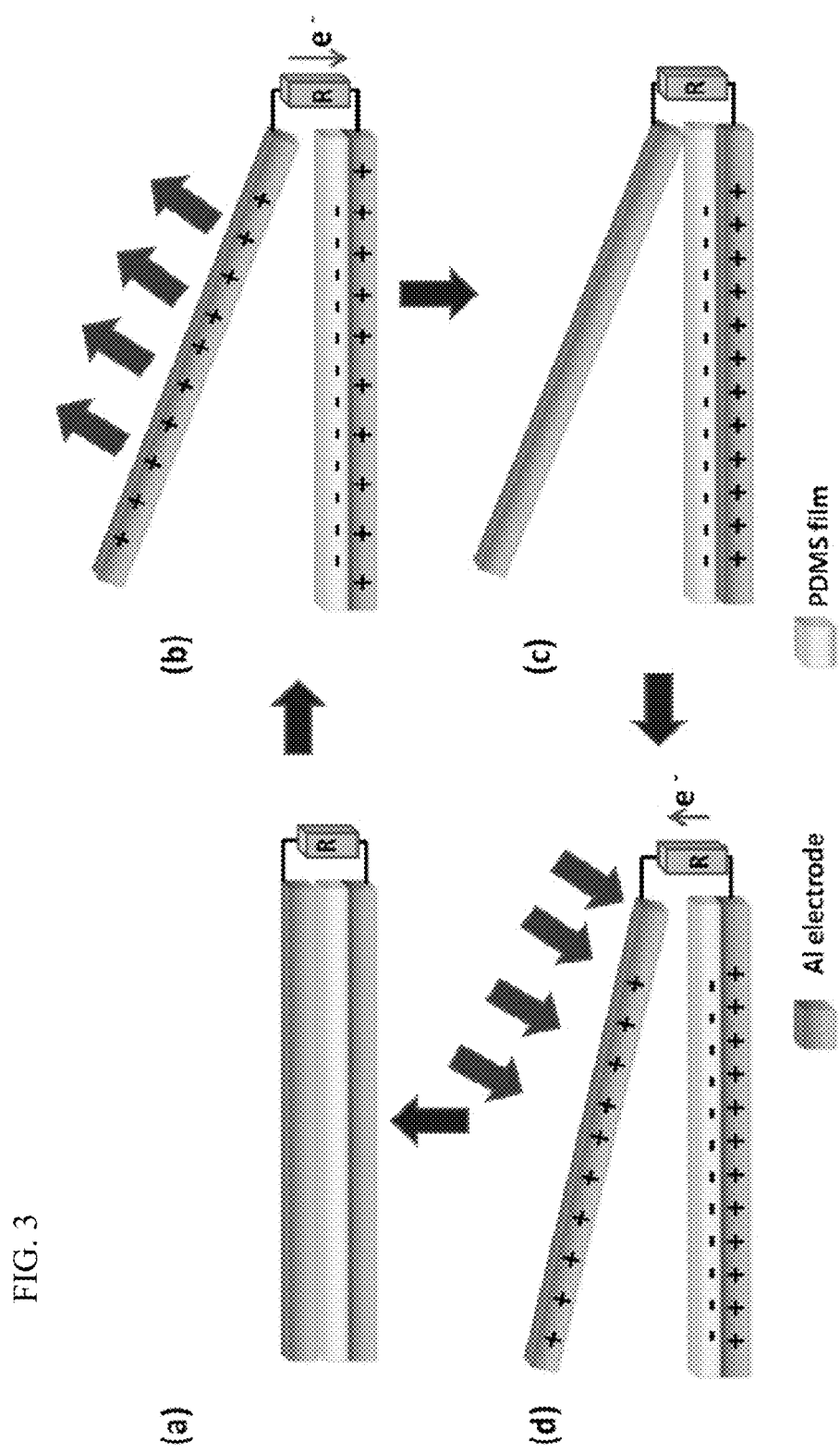
FIG. 3 is a concept view showing a mechanism when SCT-TENG according to an embodiment of the present invention is contact and/or separated, where (a) shows an initial position in which a PDMS film and a lower aluminum electrode are in contact with an upper aluminum electrode, (b) shows that while the SCT-TENG is off, the aluminum electrode is separated and charges are moved toward the lower aluminum electrode, and (c) shows an equilibrium state, and (d) while an upper electrode is moved toward a lower electrode, charges are moved toward the upper electrode.

FIG. 3 shows an energy recovery mechanism and illustrates an interaction between a surface treated PDMS and aluminum electrodes together with triboelectric and electrostatic induction. As shown in FIG. 3(a), upper aluminum electrode initially was contact with a PDMS layer. Thereafter, due to a mechanical movement, upper layers were separated and there occurs differences of charges between the electrodes. This induced charge flows from the upper electrode toward the lower electrode in a circuit connected to the outside (See FIG. 3(b)), and reached was equilibrium state in FIG. 3(c). These charge movement constitutes the first half period of AC signal. Then, a half period with negative was obtained while the upper layer was closing to the PDMS film, and charge flow toward opposite direction was induced (See FIG. 3(d)).

Figure 4:
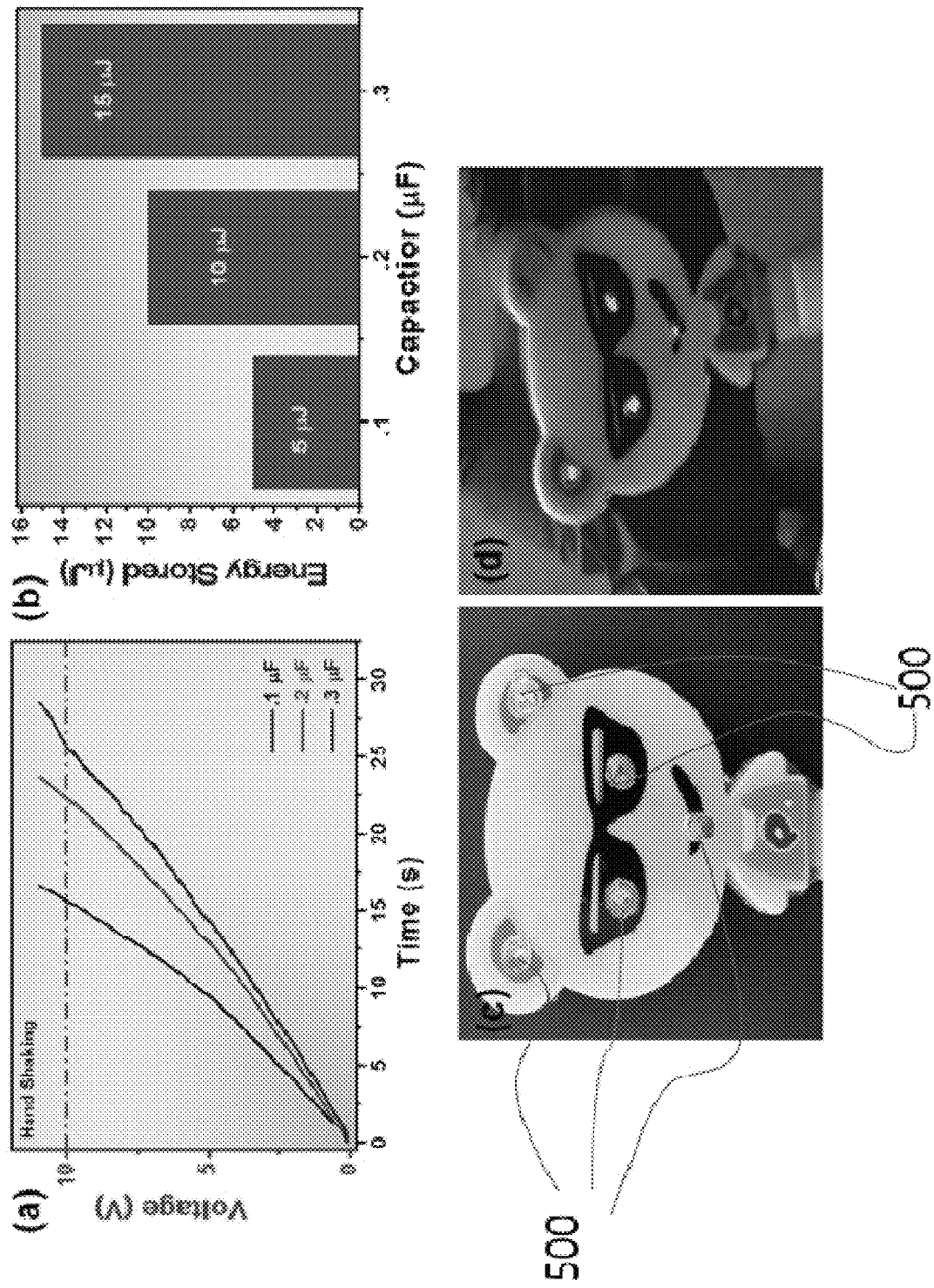
FIG. 4 shows a self-powered SCT-TENG according to an embodiment of the present invention and an energy storage performance, where (a) shows a charging voltage curve measured by a commercial capacitor of 0.1 µF to 0.3 µF, (b) shows charges stored in the capacitor, (c) shows a photograph of a self-powered SCT, and (d) shows that LED shines while the SCT-TENG is shaking.

To estimate charging ability of the SCT-TENG, AC signal was converted through a bridge rectifier to DC signal, and then connected to a common capacitor. FIG. 4(a) shows a charging voltage curve measured by a capacitor having various capacitances ranged from 0.1 µF to 0.3 µF. This curve shows an efficiency of the SCT-TENG in a simple DC power source. FIG. 4(b) showed energy stored at each of capacitors, and confirmed excellent function of the SCT-TENG as a real-time application apparatus. As shown in FIG. 4(c), six LEDs were installed at each of parts of the toy, and AC signal of the SCT-TENG was converted to DC signal and connected to the LED. Accordingly, if the SCT-TENG was shaking, biomechanical energy was converted to electric energy through triboelectric and static induction and provided power supply to the LED (See FIG. 4(d)). These test result showed that there is high possibility for the SCT-TENG to be used as a self-powered toy.

Figure 6:
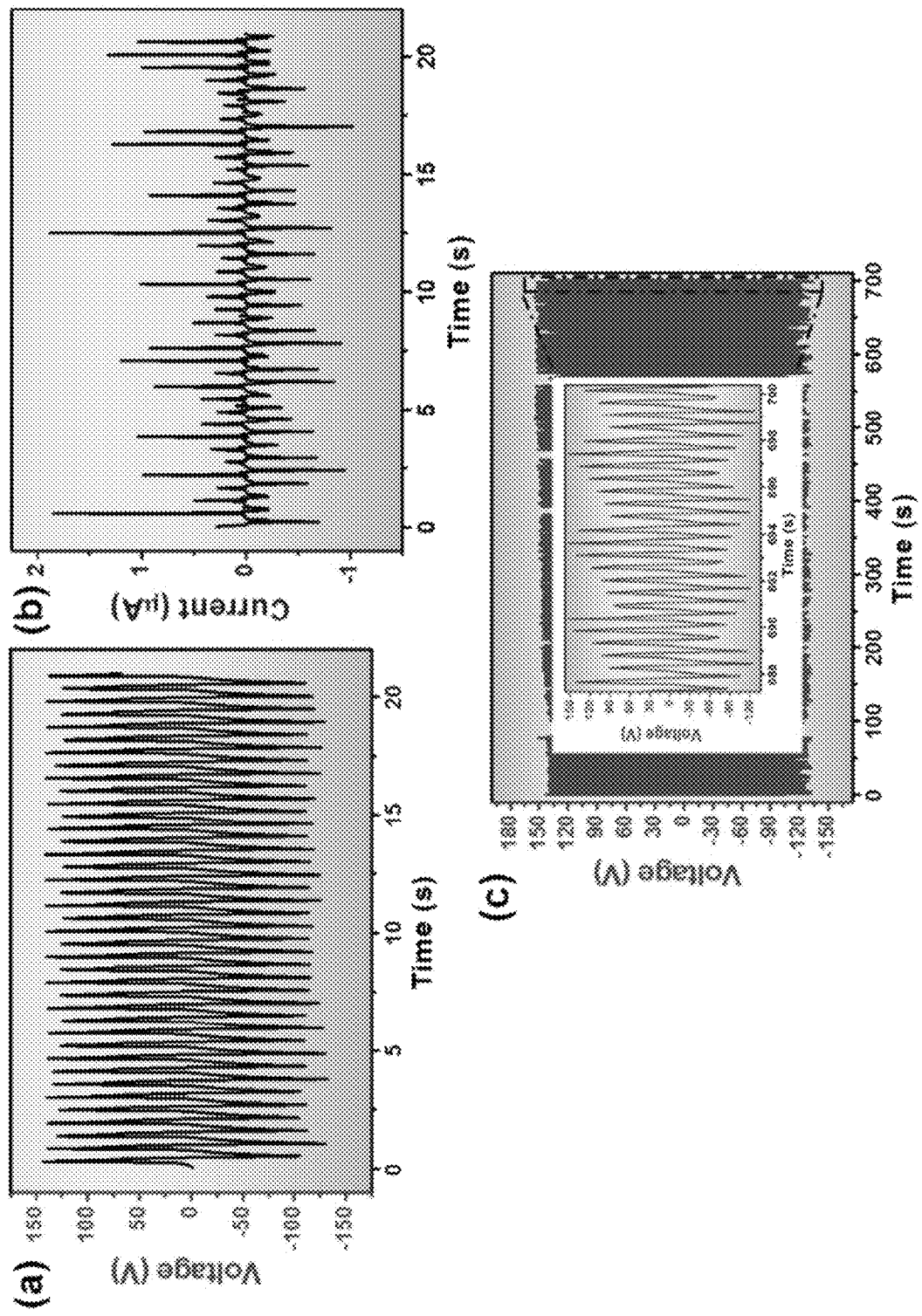
FIG. 6 a graph with respect to an electro-reaction of a SDT-TENG according to an embodiment of the present invention, where (a) shows an output voltage while a controlled external movement is applied, (b) shows a short current, and (c) shows a cyclic stability according to the external movement, and an inserted graph is an enlarged graph of a voltage signal at final section during a durability test.
Figure 7:
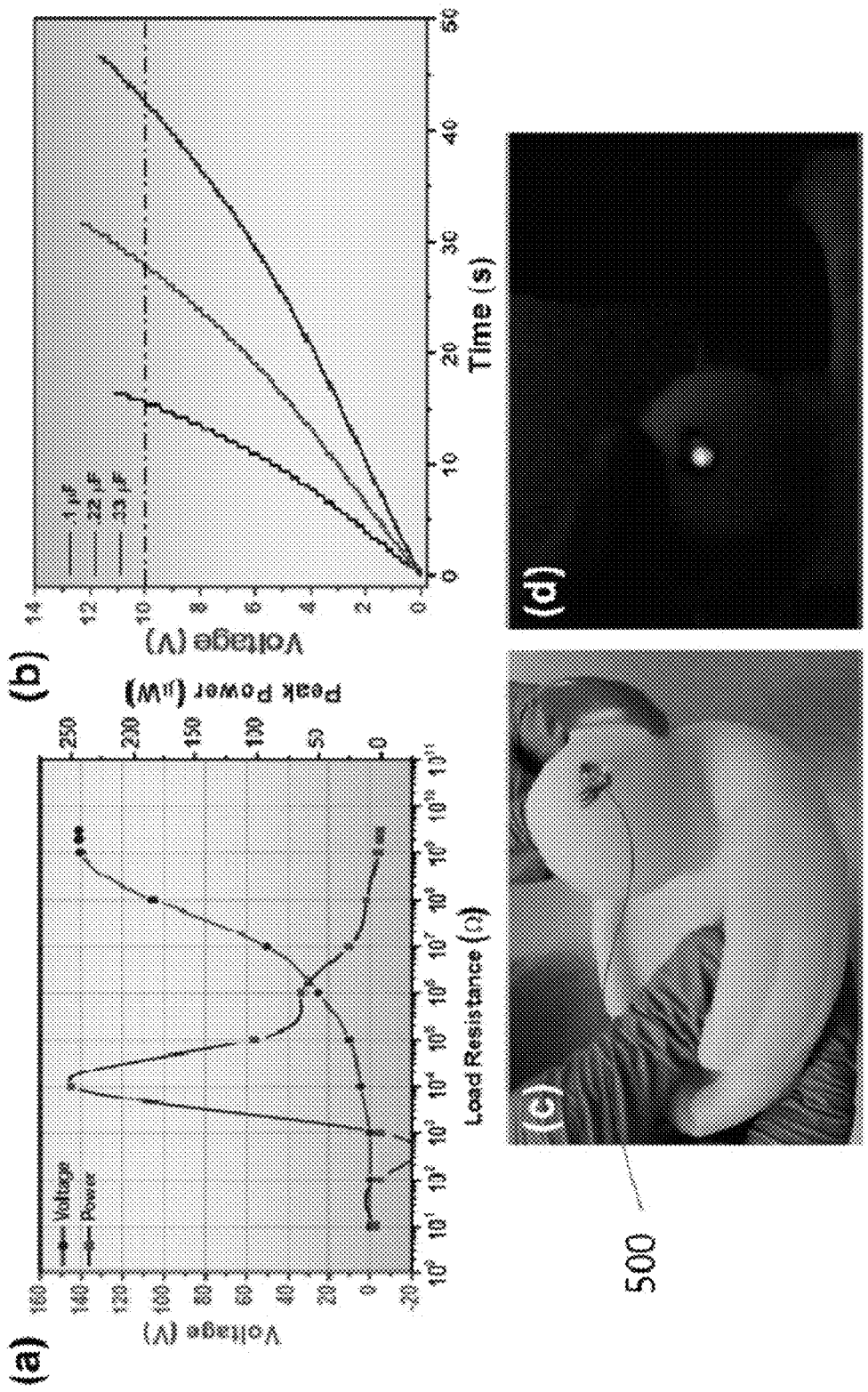
FIG. 7 shows an electro-reaction of a self-powered apparatus of a SDT-TENG according to an embodiment of the present invention, where (a) shows a graph a correlation between a voltage (see red color) and an instantaneous peak power (see blue color) in aspect of an external load resistance, (b) shows a charging voltage curve measured by a commercial capacitor of 0.1 µF to 0.3 µF, (c) shows a self-powered smart duck toy according to an embodiment of the present invention, and (d) shows a photograph showing that eyes of the smart duck toy is shining while pushing the SDT-TENG.
Figure 8:
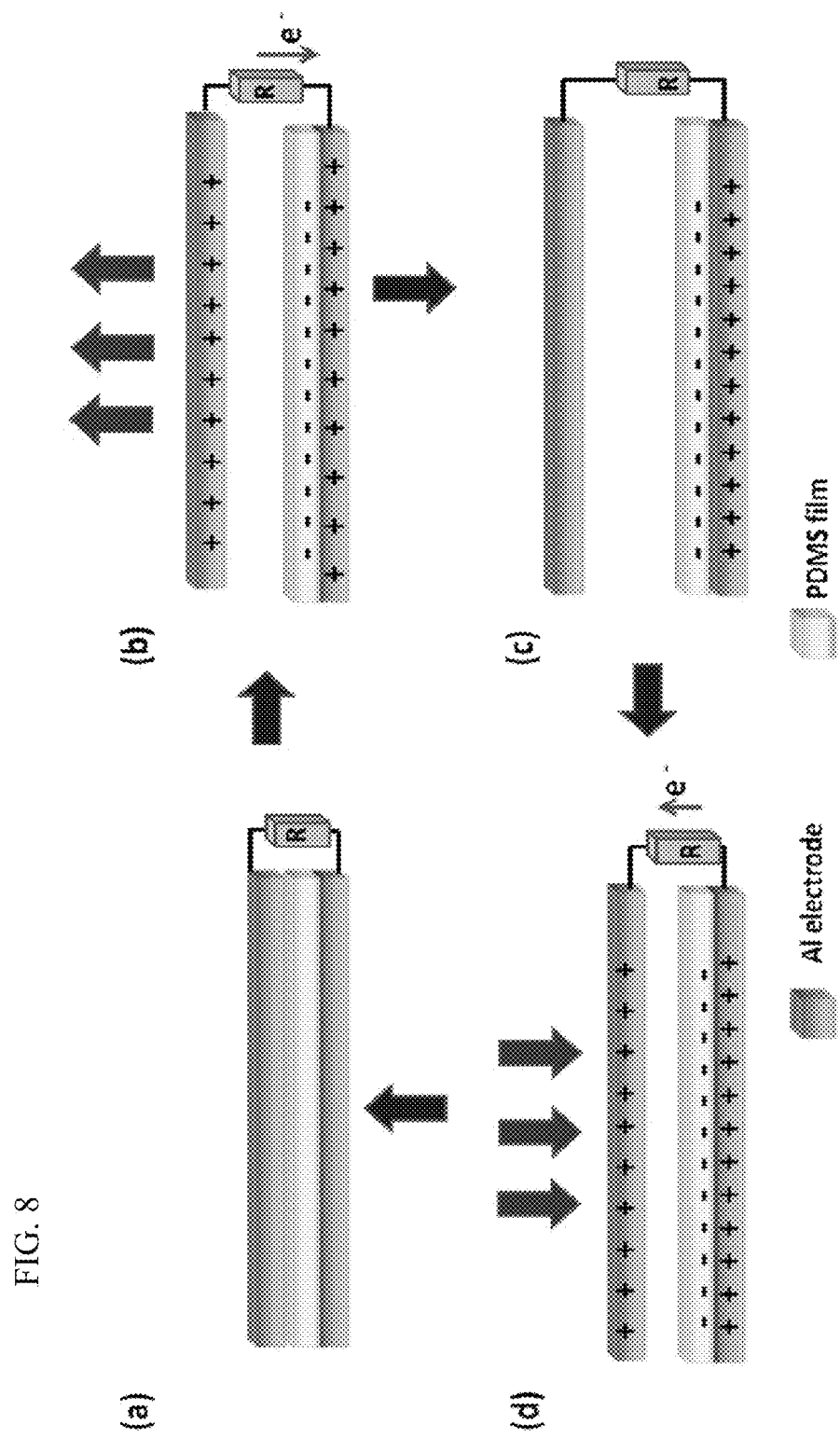
FIG. 8 is a concept view showing a mechanism when SDT-TENG according to an embodiment of the present invention is contact and/or separated in a vertical direction, where (a) shows that a lower electrode and a PDMS electrode are initially in contact with an upper electrode, (b) shows that while an external force is disappeared, the upper electrode of the SDT-TENG is separated and current flows to an external circuit, (c) shows an equilibrium state, and (d) while the upper electrode is closed to the lower electrode, charges flow toward the upper electrode.

By inserting TENG into a common duck toy generating sounds by pushing it, a smart toy was created. In more detail, biomechanical energy was recovered to brighten LED. FIG. 5(a) shows a photograph of the SDT-TENG and TENG is embedded in the toy. At this time, the PDMS film was adhered to the aluminum electrode and then, adhered on a support member. The bottom and upper sides of the toy were used as a support layer. To confirm electrical properties of the SDT-TENG, a constant external movement was made and applied by a computer controlling linear motor. FIGS. 6(a) and (b) shows an electric action of the SDT-TENG, where an output voltage represented 130 V and a short current represented 1 µA when an external movement was 1 m/s. For commercialization, durability test with respect to long-term operation of the SDT-TENG was required and accordingly, an operation test was performed for 700 seconds. FIG. 6(c) shows a voltage signal obtained from the durability test and that the operation of the SDT-TENG was dramatically stable if there were negligible changes. FIG. 8 shows an energy recovery mechanism of the SDT-TENG and illustrates an interaction between a surface treated PDMS and aluminum electrodes together with contact electrification and electrostatic induction. A load resistance analysis was performed to check a load that matches with maximum power. FIG. 7(a) shows a voltage according to an external load resistance, where the maximum peak power of 245 µW was obtained when load resistance was 10 kΩ. In order to check a charging ability of the SDT-TENG, rectified DC signal was connected to common capacitors ranged from 0.1 µF to 0.33 µF, which have different capacitance. FIG. 7(b) shows a charged voltage that measured by these capacitors. This result means a possibility that SDT-TENG can be used as power source or capable of driving low-power small electric equipment. A self-powered duck toy was manufactured by fixing two LEDs to eyes thereof (See FIG. 7(c)). Rectified DC signal from the SDT-TENG was connected through a simple circuit to the LED. If the duck toy is pushed, the SDT-TENG converted biomechanical energy to electrical energy, and thereby turning on the LED (See FIG. 7(d)). This test shows that the SDT-TENG can be an example of a self-powered toy.

According to an embodiment of the present invention, the self-powered toy is capable of driving a display unit by interactions with users without additional external power and providing a smart toy driven in an energy form such as light or sound by recovering biomechanical energy.

All such changes, modifications, variations and other uses and applications which do not depart from the spirit and scope of the invention are deemed to be covered by the invention which is limited only by the claims which follow.

What is claimed is:

1. A self-powered toy comprising:
   a power generation unit comprising a first electrode located on a first support layer; a first structure including a charge acquisition layer located on the first electrode; a second structure including a second electrode located on a second support layer; and a gap between the charge acquisition layer of the first structure and the second electrode of the second structure, which at least partially face each other;
   a display unit electrically connected to the power generation unit; and
   a housing formed with looped surfaces to have an empty space therein,
   wherein a first support layer is formed with one of inner surface of the looped surface in one entity or located on the one of inner surface of the looped surface, and a second support layer is formed with the other of inner surface of the looped surface opposing the first support layer in one entity or located on the other of inner surface of the looped surface,
   wherein the housing has elastic portions partially or wholly, and
   wherein the gap is removed by an external force directly or indirectly applied to the first structure, the second structure, or both thereof and is formed again when the external force is removed by the housing's inherent elasticity, and the display unit is driven by power generated by the power generation unit according to the removal and formation of the gap.

2. The self-powered toy of claim 1, wherein the charge acquisition layer includes one selected from the group consisting of polyester, poly-dimethyl-siloxane, and a combination thereof.

3. The self-powered toy of claim 2, wherein the display unit includes a display apparatus or a sound generating apparatus.

4. The self-powered toy of claim 1, further comprising holes formed on a part of the housing for air pressures of inside and outside of the housing.

5. The self-powered toy of claim 1, wherein the first support layer is located on a first plate or formed with the first plate in one entity, and the second support layer is located on a second plate or formed with the second plate in one entity, and
   wherein the first and second plates are positioned in order that the charge acquisition layer and the second electrode are faced each other with a predetermined gap, and the gap is removed or formed by an external force by connecting the charge acquisition layer and the second electrode each other through a connecting structure for connecting the first and second plates at least a portion of the charge acquisition layer and the second electrode.

6. The self-powered toy of claim 5, wherein the connecting structure further includes an elastic member to form the removed gap again by the external force.

7. The self-powered toy of claim 1, wherein the power generation unit has a load resistor ranged from 80 kΩ to 120 kΩ.

8. The self-powered toy of claim 1, further comprising an energy storage unit including a rectifier and a capacitor.

* * * * *